United States Patent [19]
Yamaguchi

[11] Patent Number: 6,049,350
[45] Date of Patent: Apr. 11, 2000

[54] COLOR IMAGE FORMING APPARATUS

[75] Inventor: Chiseki Yamaguchi, Niigata, Japan

[73] Assignee: NEC Corporation, Tokyo, Japan

[21] Appl. No.: 08/839,336

[22] Filed: Apr. 18, 1997

[30] Foreign Application Priority Data

Apr. 18, 1996 [JP] Japan ................................. 8-096639

[51] Int. Cl.[7] ........................................................ B41J 2/47
[52] U.S. Cl. .......................... 347/241; 347/232; 347/140
[58] Field of Search .................................. 347/116, 232, 347/241, 244, 115, 140, 228, 233, 240, 246; 359/196, 222, 197, 211, 212

[56] References Cited

U.S. PATENT DOCUMENTS 5,818,506  10/1998  Yamaguchi et al. ...................... 347/232

FOREIGN PATENT DOCUMENTS

| | | |
|---|---|---|
| 63-143570 | 6/1988 | Japan . |
| 63-143571 | 6/1988 | Japan . |
| 1-189666 | 7/1989 | Japan . |
| 4-230774 | 3/1992 | Japan . |
| 5-80631 | 4/1993 | Japan . |
| 6-286226 | 10/1994 | Japan . |
| 7-052458 | 2/1995 | Japan . |
| 7-114122 | 5/1995 | Japan . |
| 8-160694 | 6/1996 | Japan . |

*Primary Examiner*—N. Le
*Assistant Examiner*—Lamson D. Nguyen
*Attorney, Agent, or Firm*—Foley & Lardner

[57] ABSTRACT

A tandem type multi-color image forming apparatus capable of outputting a multi-color image can improve output speed of a monochrome or limited color image output. The image forming apparatus includes a single laser beam source, a plurality of image forming units, and a single polygon body. The polygon body is provided with the plurality of reflector surfaces respectively corresponded to the plurality of image forming units. The apparatus also includes an optical path selecting optical system movable into optical paths of the laser beam reflected from the rotary polygon body for deflecting the laser beam reflected from the rotary polygon body toward selected limited number of image forming units and a control portion for varying operation speed of the selected limited number of image forming units.

14 Claims, 8 Drawing Sheets

COLOR IMAGE FORMING APPARATUS

BACKGROUND OF THE INVENTION

1. Field of the Invention

The present invention relates to a color image forming apparatus. More specifically, the invention relates to a color image forming apparatus which forms latent image on a surface of a photoconductor and forms a multi-color or monochrome image on a printing medium.

2. Description of the Related Art

As such color image forming apparatus, there have been conventionally proposed and practiced several systems.

Typical one of the conventional systems is an apparatus, in which developing devices containing developers of mutually different colors are arranged with respect to a photoconductor for sequentially effecting development, respective colors of developer images formed on the photoconductor are overlaid on a printing medium or an intermediate transfer medium, in case of directly overlaying on the printing medium, the overlaid image on the printing medium is subsequently fixed, and in case where the images are overlaid on the intermediate transfer medium, the images overlaid on the intermediate transfer medium is transferred on the printing medium in batch process, and then fixed.

On the other hand, there is an apparatus, in which respective colors of developer images are selectively overlaid sequentially directly on the photoconductor to form a color developer image on the surface of the photoconductor, subsequently transferred the formed image in batch process, and then fixed.

There has been further proposed an apparatus called as a tandem type apparatus, in which a plurality of photoconductors are employed so that respective photoconductors share respective developer images of respective colors, the images formed on respective photoconductors are sequentially transferred on the printing medium, and then the image formed on the printing medium is fixed. There has been also proposed an apparatus, in which instead of directly transferring image on the printing medium by feeding the printing medium, the image is transferred via the intermediate transfer medium so as to avoid degradation of the printed image due to kind of the printing medium and/or variation of characteristics of the printing medium as much as possible.

Furthermore, in case of the method to directly form the color image on the photoconductor, there has been proposed an apparatus, in which a plurality of charging means, exposure means and developing devices having mutually different colors of developers are arranged in sequential order.

The conventional color image forming apparatus set forth above respectively encounter the following problems.

At first, in case of the apparatus which employs a method to sequentially form respective color of developer images with a single photoconductor and to sequentially overlay the developer images in sequential order, since only one photoconductor and exposure light source are used, it becomes necessary to repeat image forming operation for three or four times in order to form three or four colors of images which are required for forming the color image. Therefore, throughput in color image printing becomes low. Furthermore, for single photoconductor, respective colors of developing devices are switched, mechanical vibration tends to be caused to result in difficulty in obtaining high quality image output. Also, for arranging respective colors of developing devices on the circumference of the photoconductor, large photoconductor becomes necessary to make the overall image forming apparatus bulky and to make the production cost high in consideration of relatively low output speed.

Next, in the apparatus which employs a method to directly form the color image on the photoconductor, the photoconductor is required to be a size corresponding to a possible maximum printing medium size to be used for outputting the color image. Therefore, the photoconductor becomes bulky to results in high production cost. Furthermore, similarly to the former prior art, since the printing operation has to be repeated for three or four times, color image output speed becomes low.

In case of the tandem type color image forming apparatus, in comparison with the apparatus employing single photoconductor, a plurality of optical systems are required for exposure to form latent images on respective photoconductors. Therefore, the apparatus becomes complicate and high in production cost. Furthermore, multi-color output speed and monochrome output speed becomes equal to lowering efficiency of monochrome output which is frequently used in general, to be about one third to one fourth.

Therefore, in Japanese Unexamined Patent Publication (Kokai) No. Heisei 4-230774, for example, there has been proposed an apparatus, in which a plurality of laser beams are deflected by a polygon reflector body to guide respective laser beams to a plurality of photoconductors to perform exposure. However, in this proposal, since a plurality of laser beams are employed, it causes drawback in high cost for requirement of a plurality of lasers, as well as in difficulty of optical adjustment.

Also, in the apparatus which employs a method to sequentially arrange a plurality of charging means, exposure means and respective colors of developing devices along the circumference of single photoconductor, the photoconductor becomes quite large. Furthermore, similarly to the tandem type, in order to realize the optical system for exposure for obtaining a plurality of exposure beams to cause significant rising of the production cost.

In view of this, Japanese Unexamined Patent Publication No. Heisei 5-80631 proposes an apparatus, in which number of polygon reflector bodies is reduced to be half, and polygon reflector bodies are mounted on a single motor and whereby a production cost required for such optical system for exposure can be lowered. However, since number of the lasers required corresponds number of developing colors, the production cost is still high. Also, since a large size photoconductor belt is employed, the production cost becomes high.

On the other hand, Japanese Unexamined Patent Publication No. Showa 63-143570 or Japanese Unexamined Patent Publication No. Showa 63-143571 proposes an apparatus, in which a single polygon reflector body is employed, a plurality of inclination angles are provided for a plurality of reflector surfaces, the laser beam distributed to respective reflector surface to scan the photoconductor at a plurality of exposure positions for exposure. However, even with this, the speed of monochrome image output becomes equal to that in multi-color printing.

SUMMARY OF THE INVENTION

It is therefore an object of the present invention to provide a color image forming apparatus which is a tandem type color image forming apparatus capable of high speed color image formation, and permits higher speed output upon monochrome or two color output with single optical system for exposure and with simple switching.

According to one aspect of the invention, a color image forming apparatus for forming a latent image on a photoconductor by scanning a laser beam and forming a multicolor image on a printing medium through development of the latent image, transferring of the developed image and fixing, comprises:

a single laser beam source;

a plurality of image forming units, each including at least a photoconductor, charging means, developing means containing one of mutually different colors of developers;

a single polygon body provided with the plurality of reflector surfaces respectively corresponded to the plurality of image forming units for distributing a laser beam from the single laser beam source to the plurality of image forming units;

an optical path selecting optical system movable into optical paths of the laser beam reflected from the rotary polygon body for deflecting the laser beam reflected from the rotary polygon body toward selected limited number of image forming units; and a control portion for varying operation speed of the selected limited number of image forming units.

It is preferred that a lens in the optical path selecting optical system may also serve as surface inclination correction.

On the other hand, the rotary polygon body has more than or equal to two reflector surfaces corresponding to each image forming unit, the inclination angle of the reflector surfaces are differentiated for each of those for different image forming unit. The rotary polygon body may have reflector surfaces varying the inclination angles varying in regular order.

The control portion may switch operation speed of only the selected limited number of image forming units into high speed mode when the optical path selecting optical system is active, and stop non-selected image forming units.

Also, the control portion may modify a feeding path of a printing medium when operation speed of the selected limited number of image formation units is switched into the high speed mode.

In the alternative, the control portion may modify a rotating driving position of an intermediate transfer body when operation speed of the selected limited number of image formation units is switched into the high speed mode.

In the further alternative, the control portion may modify exposure reference clock frequency of the laser beam to be irradiated on the photoconductor when operation speed of the selected limited number of image formation units is switched into the high speed mode.

In the yet further alternative, the control portion may modify a reference light emission intensity in exposure of the photoconductor by the laser beam when operation speed of the selected limited number of image formation units is switched into the high speed mode.

In the still further alternative, the control portion may modify exposure reference clock frequency of the laser beam to be irradiated on the photoconductor and a reference light emission intensity in exposure of the photoconductor by the laser beam when operation speed of the selected limited number of image formation units is switched into the high speed mode.

With the color image forming apparatus according to the present invention, upon multi-color image output, reflected laser beams from the respectively corresponding reflector surfaces of the polygon body are irradiated for exposure in respective of the image forming units to form respective colors of latent images, and respective colors of developer images are formed on respective photoconductors by the developing devices in respective of image forming unit.

Upon monochrome or limited color image output. The optical path selecting optical system is used to deflect all of the laser beams from the polygon body to selected limited number of image forming units for exposure. The selected limited number of image forming units are driven at higher speed than that during multi-color image output. Thus, monochrome or limited color image can be formed at higher speed and/or higher density.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to be present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

Figure 1:
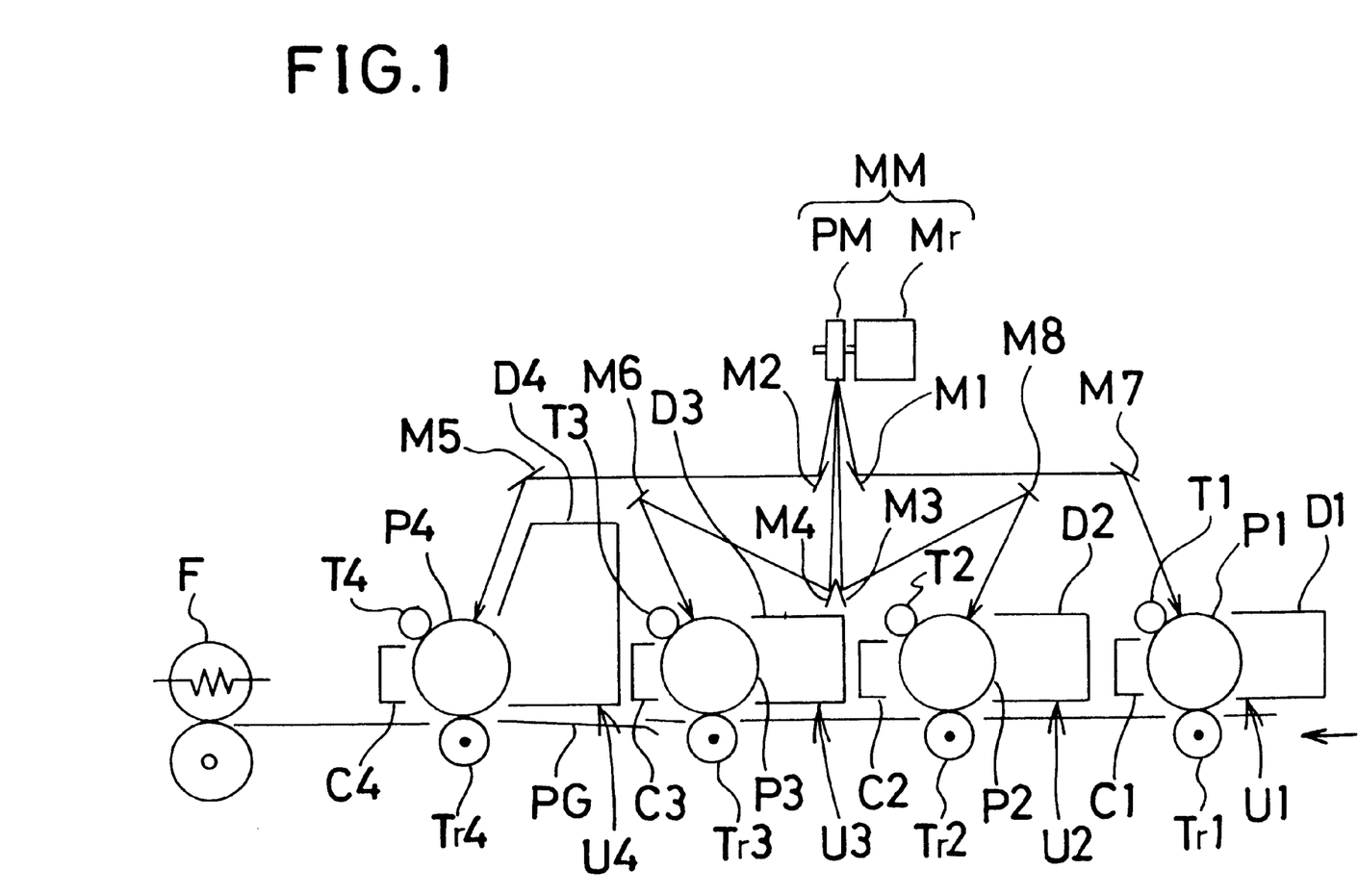
FIG. 1 is a schematic and diagrammatic illustration showing the first embodiment of a color image forming apparatus according to the present invention, which is illustrated in a condition for forming a multi-color image.

FIG. 1 is an illustration showing the construction of the first embodiment of a color image forming apparatus according to the present invention. In the shown embodiment of the color image forming apparatus, a printing medium (not shown) is fed in direction as indicated by an arrow in FIG. 1 and is printed a color image by four color developers by first to fourth image forming units U1 to U4 which are arranged in sequential order in a feeding direction.

The four sets of image forming units U1 to U4 are constructed with charging means T1 to T4, developing devices D1 to D4, cleaners C1 to C4 and transfer rollers Tr1 to Tr4 arranged around the periphery of respective photoconductors P1 to P4. In the developing devices D1 to D4, respectively different colors of developers are stored. In the shown embodiment, in the fourth developing device D4, a black developer is stored. The fourth developing device D4 is provided greater developer storage volume and than of other developing devices D1 to D3. The first developing device D1 stores a yellow developer, the second developing device D2 stores a magenta developer, and the third developing device D3 stores a cyan developer.

A rotary polygon body MM is constructed with a polygon mirror PM inclination angle of respective reflection surfaces are differentiated at predetermined condition and a motor Mr for rotatingly driving the polygon mirror PM. For the polygon mirror PM, a laser beam from a single semiconductor mirror (not shown) emitting a light according to an image information, is irradiated. The polygon mirror PM has reflector surfaces as shown in FIGS. 7 and 8.

Figure 7:
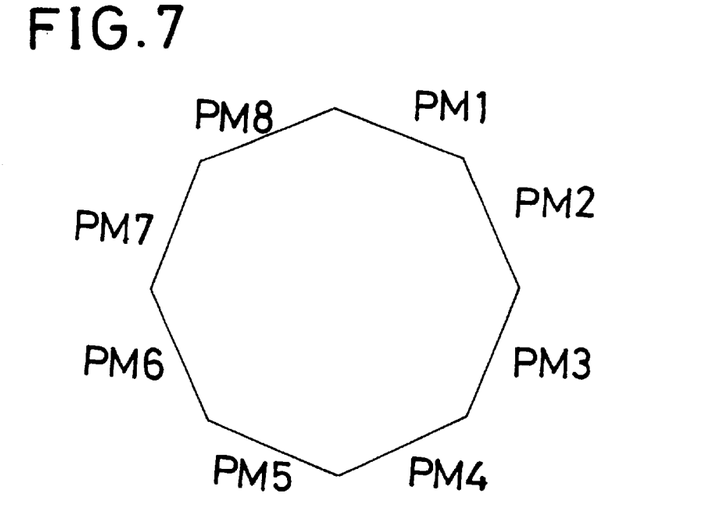
FIG. 7 is a plan view of a polygon mirror to be mounted on a rotary polygon body to be employed in the multi-color image forming apparatus according to the present invention.

FIG. 7 is an illustration the polygon mirror PM as viewed from the above. In the shown embodiment, a octahedron polygon mirror is employed. PM1 to PM8 are reference signs assigned for respective of reflector surfaces. The mirror surfaces PM1 to PM4 are provided respective different inclination angles. The mirror surface P5 has the same inclination angle as the mirror surface P1. The mirror surface P6 has the same inclination angle as the mirror surface P2. The mirror surface P7 has the same inclination angle as the mirror surface P3. The mirror surface P8 has the same inclination angle as the mirror surface P4.

Figure 8:
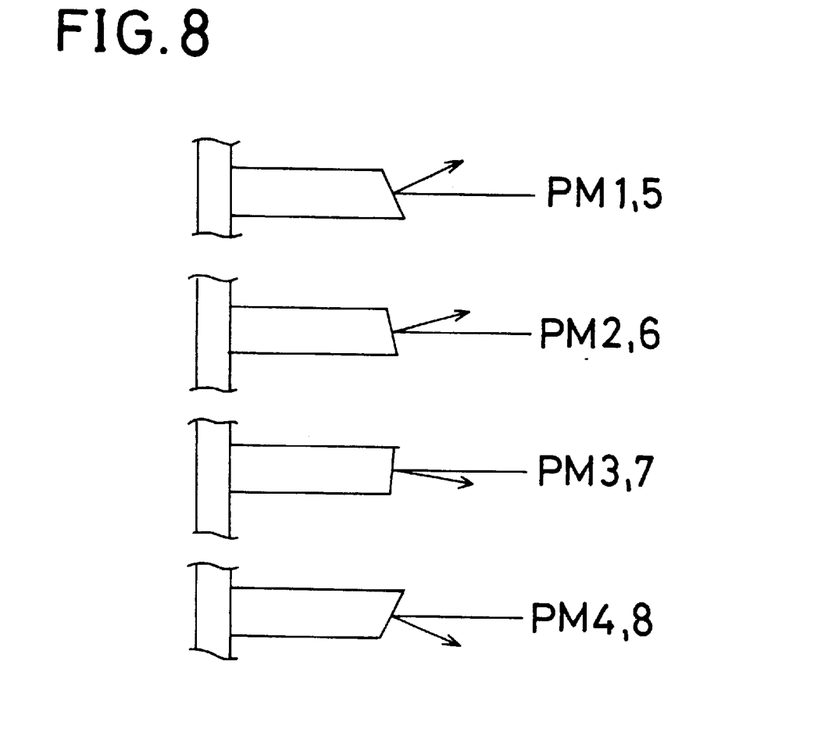
FIG. 8 is an illustration showing an inclination angle of respective reflection surfaces of the polygon mirror in the first and third embodiments of the present invention and directions of reflected light of an incident light perpendicular to a rotary shaft of the polygon mirror.

FIG. 8 illustrates inclination of respective reflector surfaces of the mirror surfaces PM1 to PM8, the mirror surfaces PM1 and PM5 are designed to reflect a laser light inciding perpendicularly to a rotation axis of the polygon mirror upwardly toward an uppermost exposure point. The mirror surfaces PM2 and PM6 are similarly designed to reflect the laser upwardly but the inclination angles thereof are smaller than those of the mirror surfaces PM1 and PM5. The mirror surfaces PM3 and PM7 are designed to reflect the incident light downwardly. Also, the mirror surfaces PM4 and PM8 are designed to reflect the incident light downwardly toward a lowermost exposure point.

The polygon mirror PM thus processed as set forth above is mounted on a motor Mr. The polygon body MM and reflector mirrors M1 to M8 are arranged as shown in FIG. 1. The laser beam emitted from a single laser beam source is guided toward respective photoconductors P1 to P4 for scanning and exposure. On the other hand, between the third image forming unit U3 and the fourth image forming unit U4, a printing medium feeding guide PG is pivotally arranged. A fixing device F is provided downstream of the most downstream photoconductor P4 for fixing the image transferred on a printing medium by heat and pressure.

Figure 2:
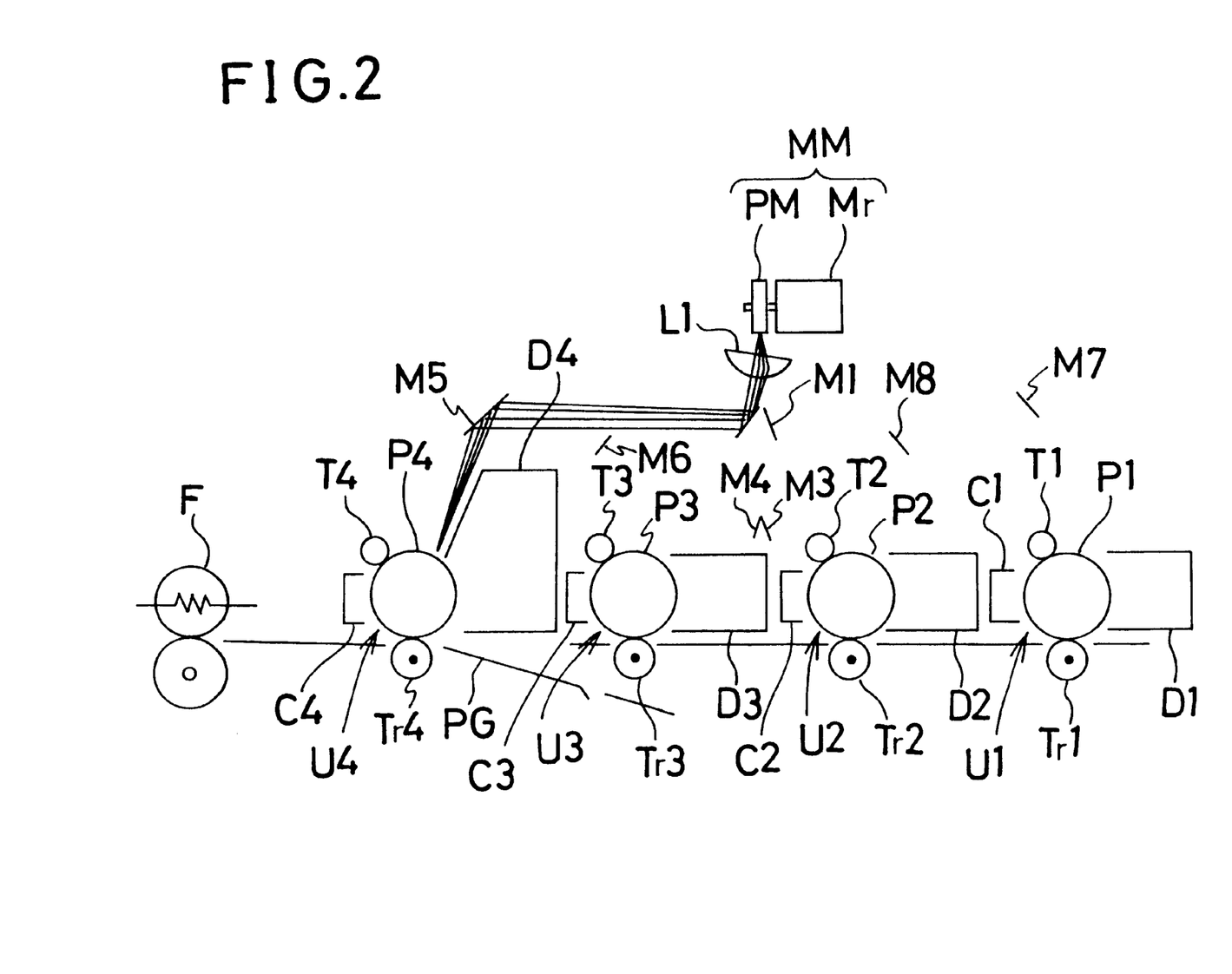
FIG. 2 is a schematic and diagrammatic illustration showing the first embodiment of the color image forming apparatus according to the present invention, which is illustrated in a condition for forming a monochrome image.

FIG. 2 shows a construction, in which a cylindrical lens L1 for an optical path selection and surface inclination correction with reference to an optical axis relative to the photoconductor P4, is disposed so that all of the laser beam reflected by respective reflector surfaces PM1 to PM8 of the polygon mirror PM are directed to the photoconductor P4, in addition to the construction shown in FIG. 1. At this time, a control portion (not shown) causes downward pivotal movement of the printing medium feeding guide PG, and the operation speed of only fourth image forming unit U4 is modified to be four times of that of the multi-color printing, and in conjunction therewith, the rotation speed of the fixing device F is also modified to be four times of that in the multi-color printing.

Next, operation will be described with reference to FIGS. 1, 7 and 8.

Upon initiation of printing operation, respective image forming units U1 to U4 having respective photoconductors P1 to P4, a rotary polygon body MM and a fixing device F are driven and rotated. With respect to the laser beam source, respective color of image information for one scan is fed sequentially according to the image information, and then scanning exposure is performed for the photoconductors P1 to P4 by means of the polygon mirror PM. In the shown embodiment, upon irradiation of laser with respect to the reflector surface of the mirror surface PM1. In the shown embodiment, the laser is irradiated on the photoconductor of the fourth image forming unit U4 for forming the black image. Next, with respect to the reflector surface of the mirror surface PM2, laser beam is irradiated to the photoconductor P3 corresponding to formation of cyan image formation in the shown embodiment. Next, the laser beam is irradiated on the reflector surface of the mirror surface PM3 and then irradiated on the photoconductor P2 corresponding to formation of magenta image in the shown embodiment. Then, the laser beam is irradiated on the reflector surface of the mirror surface PM4 and then irradiated on the photoconductor P1 corresponding to formation of yellow image in the shown embodiment. Subsequently, scanning and exposure of laser beams, i.e. laser beam corresponding to the black image similarly to that irradiated on the mirror surface PM1, is irradiated on the mirror surface PM5, laser beam corresponding to the cyan image similarly to that irradiated on the mirror surface PM2, is irradiated on the mirror surface PM2, laser beam corresponding to the magenta image similarly to that irradiated on the mirror surface PM3, is irradiated on the mirror surface PM7, and laser beam corresponding to the yellow image similarly to that irradiated on the mirror surface PM4, is irradiated on the mirror surface PM8. Then, foregoing scanning and exposure is repeated to form latent images corresponding to respective colors are formed on respective surfaces of the photoconductors. Then, the latent images are then developed by respective colors of developers, and respective colors of developer images are formed on respective photoconductors. Adapting to this, a printing medium is fed from a printing medium feeding portion (not shown) from the side of the photoconductor P1 and fed across the photoconductors P2, P3 and P4 in sequential order. Then, respective colors of developer images are transferred for overlaying on the printing medium by respective transfer rollers Tr1, Tr2, Tr3 and Tr4. Therefore, the image formed on the printing medium is fixed by the fixing device. Thus, multi-color image is output.

On the other hand, respective colors of developers not transferred to the printing medium and residing on the photoconductors P1 to P4 are cleaned by respective cleaners C1 to C4 arranged corresponding to respective photoconductors P1 to P4. Then, respective photoconductors P1 to P4 are used for next image formation.

Next, in the same construction of the apparatus, operation for high speed printing with the color of developer in the developing device D4, in the shown embodiment in black color, will be discussed hereinafter. At this time, the construction is modified as shown in FIG. 2. Namely, in order to irradiate all of the laser beam reflected from respective reflector surfaces PM1 to PM8 of the polygon mirror PM, the cylindrical lens L1 is disposed with respect to the optical axis for directing laser beams reflected from the polygon mirror PM toward the photoconductor 4. In FIG. 1, the cylindrical lens L1 modifies the optical paths for reflecting and scanning the laser beams reflected and scanned toward the photoconductors P1, P2 and P3 toward the photoconductor P4. In addition, the photoconductor P4, the developing device D4, the charging means T4, the cleaner C4, the transfer roller Tr4 and fixing device F arranged in the image forming unit U4 which includes the photoconductor P4 are modified the operation speed to be four times higher than the speed in the operation with the construction illustrated in FIG. 1. Also, concerning the feeding path of the printing medium, instead of feeding across the portions of the transfer rollers Tr1 to Tr3, the feeding guide portion PG is pivoted about a position in the vicinity of the transfer roller Tr4 so that the printing medium may be directly fed to the fourth image forming unit U4. From the paper feeding portion (not shown), the printing medium is transferred directly to the photoconductor P4 and the transfer roller Tr4.

By operation with such modified construction, without modifying rotation speed of the rotary polygon body MM. Also, without modifying the laser power, the image of developer color of the developing device D4, image output can be done at an four times higher output speed than that upon multi-color output with maintaining the same resolution as that upon multi-color output. On the other hand, at this time, since the operation of the first to third image forming units U1 to U3 having photoconductors P1 to P3, even in four times higher speed operation, increasing of load with respect to the driving source, such as driving motor is little. Also, relative life of the image forming units U1 to U3 which are held in resting can be expanded. Furthermore, in this case, in comparison with the case where the respective colors of developer images are overlaid in multi-color printing, developer mass is small for single color image, and the developer layer becomes thinner to require lesser heat amount for the fixing device. Therefore, even in higher speed of operation, little modification is required in the operating condition, such as temperature and pressure of the fixing device.

Figure 3:
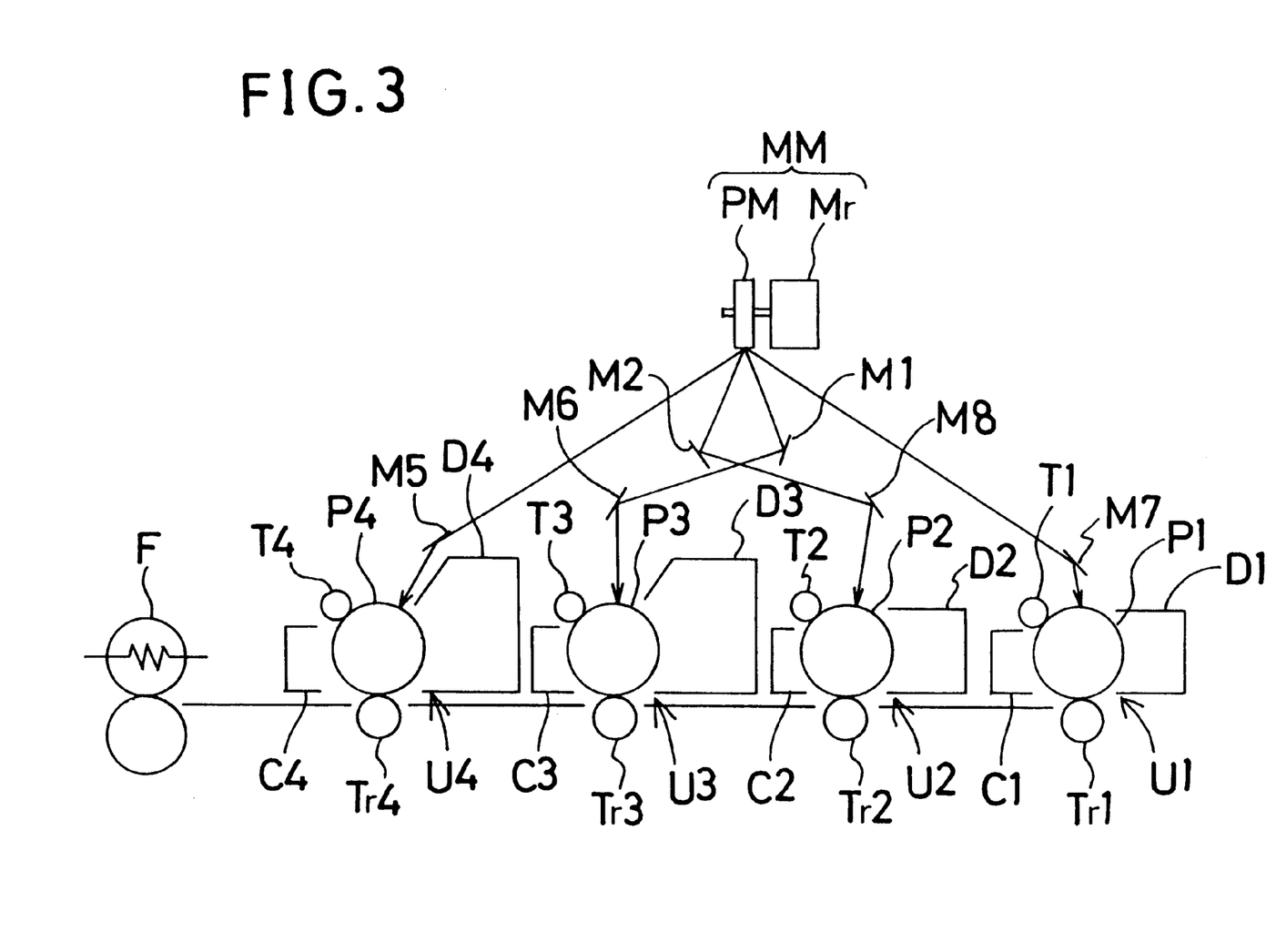
FIG. 3 is a schematic and diagrammatic illustration showing the second embodiment of the color image forming apparatus according to the present invention, which is illustrated in a condition for forming a multi-color image.
Figure 4:
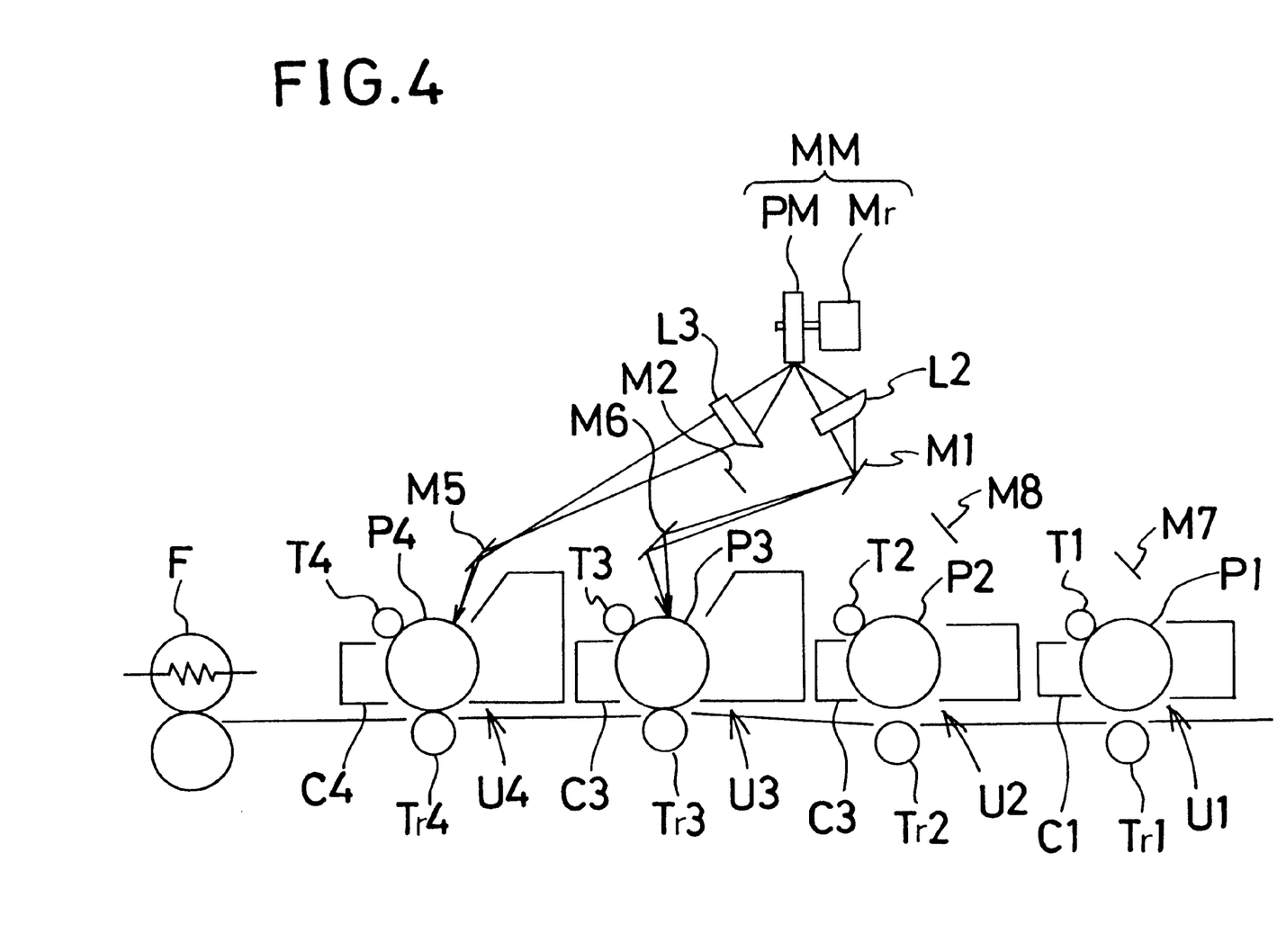
FIG. 4 is a schematic and diagrammatic illustration showing the second embodiment of the color image forming apparatus according to the present invention, which is illustrated in a condition for forming a two color image.

FIGS. 3 and 4 are diagrammatic illustrations showing construction of the second embodiment of the color image forming apparatus according to the present invention.

Figure 9:
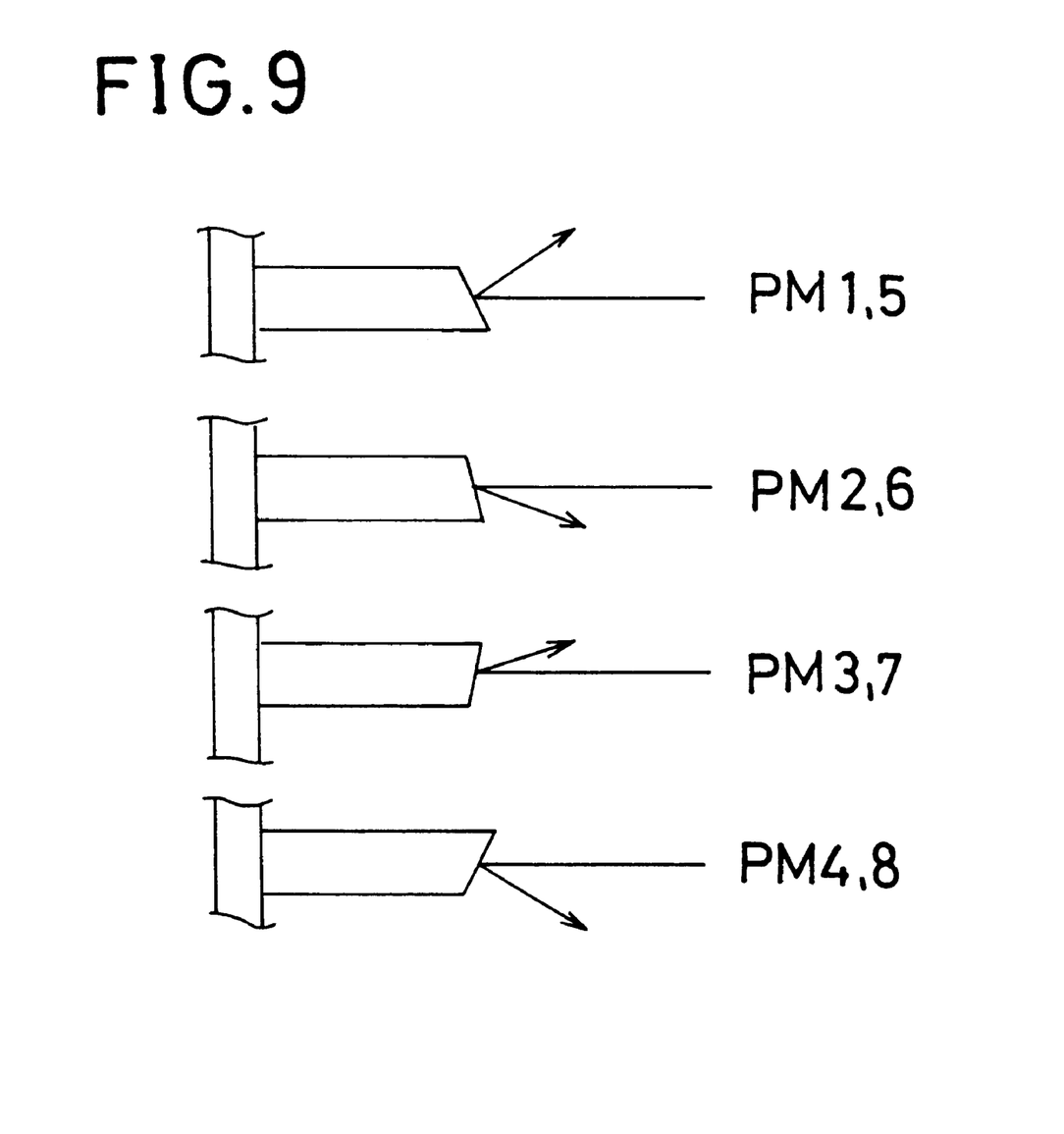
FIG. 9 is an illustration showing an inclination angle of respective reflection surfaces of the polygon mirror in the second embodiment of the present invention and directions of reflected light of an incident light perpendicular to a rotary shaft of the polygon mirror.

The construction and layout of respective image forming units U1 to U3 are the same as those of FIG. 1. Sizes of the developing devices D3 and D4 for the photoconductors P3 and P4 are greater than the sizes of the developing devices D1 and D2. Also, the rotary polygon body MM and layout of the reflected beam paths and the reflector mirrors are differentiated from those of FIG. 1. Inclination of the surface of the polygon mirror PM employed in the shown embodiment is as illustrated in FIG. 9. As can be seen, a reflection angle upon incident laser beam from the laser beam source is reflected by the polygon mirror PM is different from that in the case where the polygon mirror shown in FIG. 1 is employed. In the shown embodiment, PM1 and PM5 directs the reflected laser beam to uppermost exposure point, PM2 and PM3 are directed downwardly, PM3 and PM7 are direction upwardly, and PM4 and PM8 are directed to the lowermost exposure point. As set forth above, the construction of the reflection angle is different from those of FIG. 8, with the construction of the reflection mirror, the image data is emitted and irradiated from the laser corresponding to the developing devices D4, D3, D2 and D1 similarly to the first embodiment.

On the other hand, in FIG. 4, the apparatus is modified for two color outputting, in the shown embodiment two color output of black and cyan. Namely, in FIG. 4, an optical path selection and surface inclination correcting lens L3 with respect to the optical path scanned toward the photoconductor P4 and the optical path scanned toward the photoconductor P2 and an optical path selection and surface inclination correcting lens L2 with respect to the optical path scanned toward the photoconductor P3 and the optical path scanned toward the photoconductor P1, in the construction shown in FIG. 3, are disposed so that the optical path directed to the photoconductor P2 is modified to be directed to the photoconductor P4, and the optical path directed to the photoconductor P1 is modified to be directed to the photoconductor P3. Also, at this time, the operation speed of the third and fourth image forming units U3 and U4 having the photoconductors P3 and P4, and the fixing device F is modified by the control portion to be double of the case in FIG. 3. Also, the transfer rollers Tr1 and Tr2 are shifted downwardly in the direction away from the photoconductors P1 and P2.

Next, operation will be discussed with reference to FIG. 3.

Upon formation of the multi-color image, respective image forming units U1 to U4, the fixing device F and the rotary polygon body MM are placed in conditions for forming the images. Then, according to the image information, image information of respective colors per each scan is fed sequentially. Then scanning and exposure is performed for respective of the photoconductors P1 to P4 by the polygon mirror PM to form latent images on respective photoconductors. The latent images on respective photoconductors P1 to P4 are developed by respective colors of developers to form respective colors of developer images. In synchronism therewith, the printing medium is fed from the printing medium feeding portion (not shown). Then, the respective colors of the developer images are transferred on the printing medium in sequential order. Thereafter, the multi-color image is output through the fixing device F.

Next, discussion will be for operation in outputting two color image. At first, as set forth above, the optical path selection and surface inclination correcting lens L3 and L2 are disposed. In conjunction therewith, the operation speeds of the image forming units U3 and U4 having the photoconductors P3 and P4 and the fixing device F are modified by the control portion. According to the image information, the image data for two scanning cycles of black and cyan is input to the control portion. Then, the control portion controls irradiation of the laser beam onto the reflection surfaces of the polygon mirror adapting to the two scanning cycles of the image information. Then, the laser beams are then deflected to be irradiated onto the photoconductors P3 and P4 as reflected by the polygon mirror to form the latent images thereon. The latent images formed on the photoconductors P3 and P4 are developed by the developing devices D3 and D4. In synchronism with this, the printing medium is fed from the printing medium feeding portion via the transfer rollers Tr1 and Tr2 to the photoconductor P3 and the transfer roller Tr3. Then, cyan image is transferred from the photoconductor D3 to the printing medium, then the black image is transferred to the printing medium between the photoconductor P4 and the transfer roller Tr4. Then, the printing medium is transferred across the fixing device F to fix the image formed thereon. Therefore, in the shown embodiment, the two colors of image can be output at double speed as that in the multi-color (more than or equal to three colors). At this time, the image forming units U1 and U2 having the photoconductors P1 and P2 are held in resting.

While the shown embodiment is directed to the embodiment, in which the operation speed is increased to be double, the variation rate of the speed of image output is not essential to the claimed invention. For instance, the speed may be modified to be 1.5 times of the that in the multi-color printing. At this time, if the rotation speed of the polygon body is the same as that in multi-color printing. The image density in the auxiliary scanning direction of the image becomes 1.5 times. Of course, the speed may be as is, it is also possible to modify at least one of the clock frequency of the laser beam emitting and a reference light emitting intensity. For example, when scanning and exposure is assumed to be performed at 600 DPI in the primary scanning direction (600 dots/inch) and 600 DPI in the auxiliary scanning direction, if the process speed is modified to be double upon two color output, the twice higher speed output at 600 DPI×600 DPI becomes possible without modification of the laser light emitting frequency and light intensity. Here, when the process speed is risen to be 1.5 times, the resolution in the primary scanning direction becomes 600 DPI and the resolution in the auxiliary scanning direction becomes 800 DPI. Then, by setting the laser light emitting frequency at 4/3 times, the resolutions both primary scanning direction and the auxiliary scanning direction can be 800 DPI. At this time, the laser spot diameter on the photoconductor for 600 DPI is not optimal for 800 DPI, optimization can be achieved by lowering the reference light emission intensity.

Figure 5:
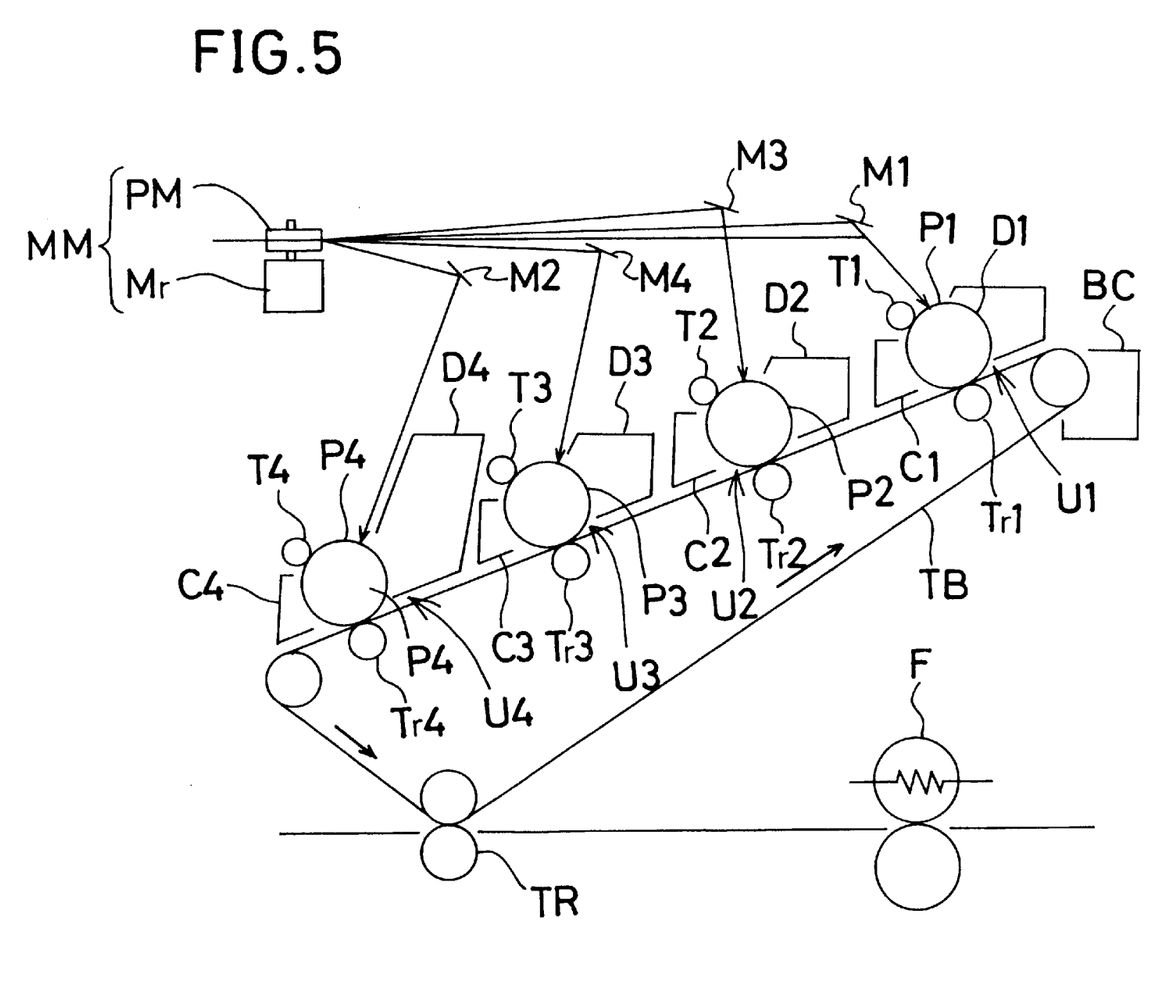
FIG. 5 is a schematic and diagrammatic illustration showing the third embodiment of the color image forming apparatus according to the present invention, which is illustrated in a condition for forming a multi-color image.
Figure 6:
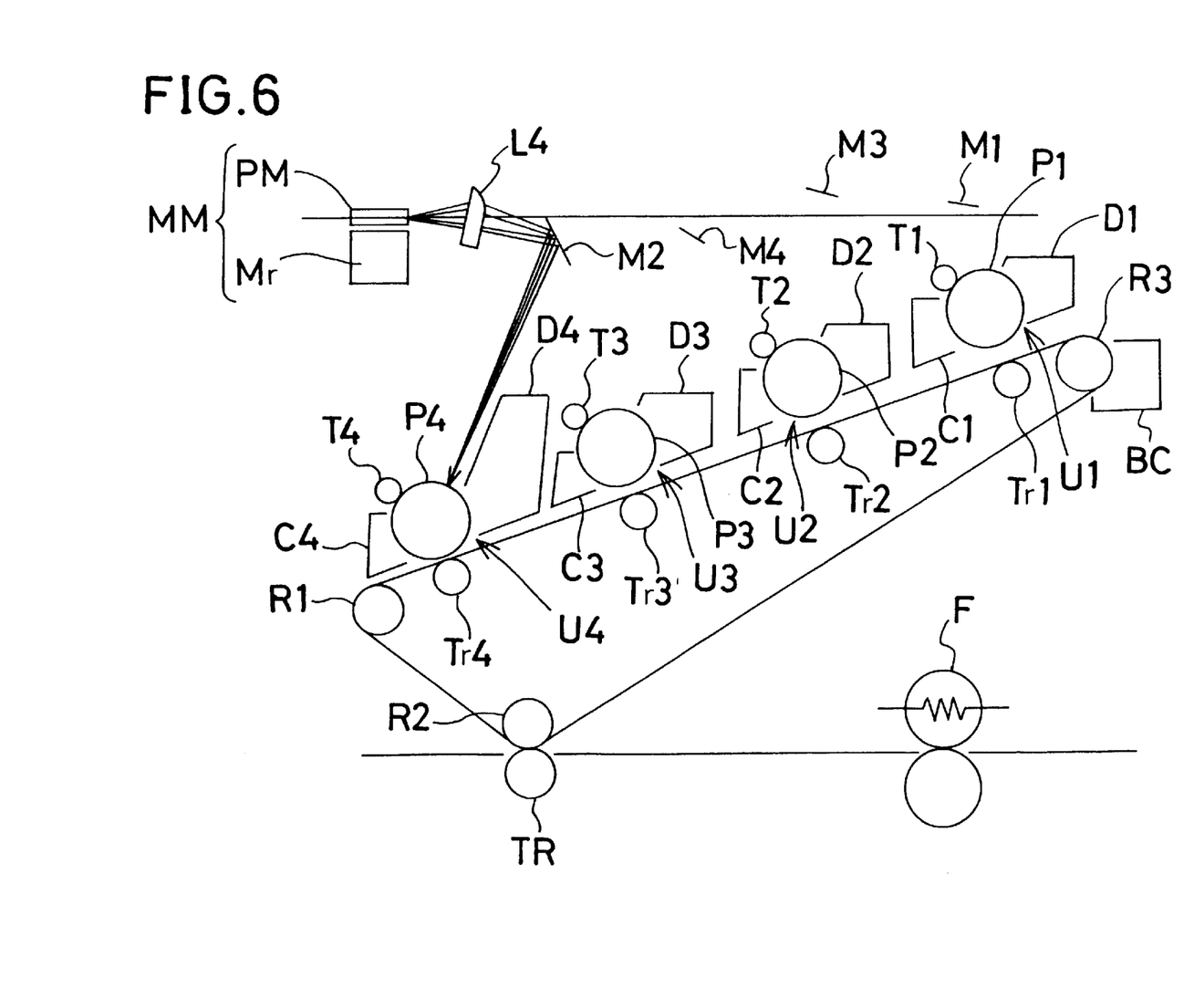
FIG. 6 is a schematic and diagrammatic illustration showing the third embodiment of the color image forming apparatus according to the present invention, which is illustrated in a condition for forming a monochrome image.

FIGS. 5 and 6 are diagrammatic illustration showing the third embodiment of the image forming apparatus according to the present invention.

The respective colors of image forming units U1 to U4 are constructed similarly to those of FIG. 1 while configuration of respective processes are slightly differentiated. In the shown embodiment, respective colors of developer image formed by respective color of image forming units U1 to U4 are transferred onto an intermediate transfer belt TB sequentially to form the image thereon, and then the formed image is transferred to the printing medium in batch process by a batch transfer roller TR. It should be noted that respective transfer rollers Tr1 to Tr4 oppose to respective photoconductors P1 to P4 via the intermediate transfer belt TB. The intermediate transfer belt TB after transferring the image to the printing medium is cleaned by a belt cleaner BC so that it may be used for next image formation. Different from the foregoing first and second embodiments, the rotary polygon body MM is arranged for reflection to scan in horizontal direction. The polygon mirror PM is constructed as illustrated in FIGS. 8 and 7. The laser beam reflected by the polygon mirror PM is directed such that the reflected beams of the mirror surfaces PM1 and PM5 are directed to the photoconductor P2, the reflected beams of the mirror surfaces PM2 and PM6 are directed to the photoconductor P1, the reflected beams of the mirror surfaces PM3 and PM7 are directed to the photoconductor P3 and the reflected beams of the mirror surfaces PM4 and PM8 are directed to the photoconductor P4.

On the other hand, upon monochrome output as shown in FIG. 6, the belt roller R3 and the transfer rollers Tr1 to Tr3 are shifted downwardly, and the belt roller R3 is shifted together with the belt cleaner BC. By this, the intermediate transfer roller TB travels at a position away from the photoconductors P1 to P3. Also, associating therewith, the first to third image forming units U1 to U3 having the photoconductors P1 to P3 are stopped operations by the control portion. In contrast to this, the image forming unit having the photoconductor P4 and the intermediate transfer belt TB and the fixing device F are driven at twice higher speed than that in the multi-color printing as shown in FIG. 5. Concerning the optical path, a optical path selection and surface inclination correcting lens L4 is disposed so that all of the laser beams reflected from respective reflector surfaces of the polygon mirror PM are directed to the photoconductor P4 for scanning and exposure.

The operation of the shown embodiment constructed as set forth above and which can be modified, will be discussed with reference to FIG. 5. When respective portions become ready for image formation during multi-color image output, respective colors of image information for one scanning cycle is sequentially fed according to the image information. Then scanning and exposure is performed with respect to respective of the photoconductors P1 to P4 by the polygon mirror PM. Thus, latent images are formed on respective surfaces of the photoconductors. The latent images thus formed are developed by respective developing devices to form respective colors of developer images. The respective colors of developer images are transferred onto the intermediate transfer belt TB which is circulating in contact with respective photoconductors. Thus, respective color of developer images are overlaid on the intermediate transfer belt TB. The multi-color image thus formed on the intermediate transfer belt TB is transferred onto the printing medium in batch process by the batch transfer roller TR. Subsequently, the multi-color image transferred on the printing medium is fixed by the fixing device F under heat and pressure. The residual developer on respective hotoconductors P1 to P4 and the intermediate transfer belt TB are cleaned by respective cleaners C1 to C4 and BC.

Next, discussion will be given for monochrome image output with modification as illustrated in FIG. 6. The optical path selection and surface inclination correcting lens L4 is disposed. The belt roller R3, the transfer rollers Tr1 to Tr4 are shifted. Also, the image forming unit U4 having the photoconductor P4, the intermediate transfer belt TB, the fixing device F and the batch transfer roller TR are modified the operation speed to be double by the control portion in comparison with that in the multi-color printing. Also, the reference light emission clock frequency of the laser is set to be twice higher frequency. According to the image information, the image data achieving twice higher resolution in the primary scanning direction and in the auxiliary scanning direction, in comparison with that in the multi-color printing, is generated by an image processing system (not shown). On the basis of this data, the laser is driven. The reflected laser beam from the polygon mirror is all directed to the photoconductor P4 by the lens L4. Since the photoconductor P4 is rotating at twice higher speed in comparison with that during multi-color printing, the latent image is formed on the photoconductor with a resolution in auxiliary scanning direction to be twice higher than that in the multi-color printing. Also, since the reference light emission clock frequency of the laser is set twice higher than that in the multi-color printing, the resolution in the primary direction also becomes twice higher than that in the multi-color printing. The latent image thus formed is developed by the developing device D4 and then transferred to the transfer belt TB. Thereafter, the image on the intermediate transfer belt TB is transferred to the printing medium by the batch transfer roller TR. Finally, the image transferred on the printing medium is fixed by the fixing device. Therefore, the monochrome image can be output at twice higher speed and twice higher resolution than that in the multi-color printing. Even in the shown embodiment, the reference light intensity on the photoconductor surface of the laser may be varied as in the second embodiment. The processing speed during monochrome printing is not specified to double as in the shown embodiment.

As set forth above, according to the present invention, while a plurality of image forming units are employed for high speed multi-color image output, respective image forming units can be scanned and exposed by single laser beam source and single rotary polygon body. Also, upon monochrome printing or limiting color printing, such as two color printing with operating selected image forming units, the non-selected image forming units are placed in resting state, and the selected image forming units are driven at higher speed than that during multi-color printing. Thus, the production cost of the printing apparatus can be significantly reduced. Also, for demand of output, namely to effect monochrome or limited color printing, output can be done at higher speed than that in the multi-color output.

Multi-color output and higher speed monochrome or limited color output can be realized without any significant modification with only insertion of optical path selecting optical system and modification of the process speed.

On the other hand, upon image output by selected image forming unit, other image forming units are held in resting. Therefore, no additional load may be caused for the driving source of the apparatus. Thus, high speed monochrome or limited color image output can be attained without any modification or replacement of the driving system.

Furthermore, in addition to the optical system employing the single exposure light source and the rotary polygon body, respective colors of image forming units are the identical construction to each other, the production cost of the apparatus can be significantly lowered.

Also, upon image output by the image output of the selected image forming unit, since other image forming units are held in resting, relative life of such other image forming unit can be expanded to provide longer replacing interval. Thus life of the apparatus can be expanded.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, modification of the image forming unit and the speed of the associated processes in monochrome or limited color printing should not be limited to those set forth above. Also, upon monochrome or limiting color image output, the reference light emission clock frequency and reference light intensity on the photoconductor surface may be varied arbitrarily. Furthermore, the shape of the polygon mirror is not specified to octahedron, and any shape of multiple in positive integer of the image forming unit may be employed. In addition, the inclination of the surfaces relative to the rotary axis is not necessarily set as that illustrated. It is only required that the variation of angle between the adjacent surfaces is constant and the reflector surfaces are repeated regularly.

What is claimed is:

1. A color image forming apparatus for forming a latent image on a photoconductor by scanning a laser beam and forming a multi-color image on a printing medium, comprising:

a single laser beam source;

a plurality of image forming units, each including at least a photoconductor, a charger, a developing device containing one of mutually different colors;

a polygon body provided with a plurality of reflector surfaces respectively corresponding to said plurality of image forming units for distributing a laser beam from said single laser beam source to said plurality of image forming units; and an optical path selecting optical system movable into optical paths of the laser beam reflected from said polygon body for deflecting the laser beam reflected from said polygon body toward a selected number of image forming units but not toward non-selected image forming units, wherein the selected number of image forming units is less than the total number of said plurality of image forming units.

2. A color image forming apparatus as set forth in claim 1, wherein said optical path selecting optical system comprises a lens.

3. A color image forming apparatus as set forth in claim 1, wherein said polygon body has at least two reflector surfaces corresponding to each image forming unit.

4. A color image forming apparatus as set forth in claim 1, wherein the selected image forming units are operated at higher speeds when said optical path selecting optical system is moved into the optical paths of the laser beam and the non-selected image forming units are not operated.

5. A color image forming apparatus as set forth in claim 4, further comprising a printing medium feed guide that is moved when said optical path selecting optical system is moved into the optical paths of the laser beam.

6. A color image forming apparatus a set forth in claim 4, wherein the photoconductors of the image forming units are implemented as an intermediate transfer body and a speed of the intermediate transfer body is increased when said optical path selecting optical system is moved into the optical paths of the laser beam.

7. A color image forming apparatus as set forth in claim 4, wherein an exposure reference clock frequency of the laser beam to be irradiated on said photoconductor is modified when said optical path selecting optical system is moved into the optical paths of the laser beam.

8. A color image forming apparatus as set forth in claim 4, wherein a reference light emission intensity of the laser beam is modified when said optical path selecting optical system is moved into the optical paths of the laser beam.

9. A color image forming apparatus as set forth in claim 4, wherein an exposure reference clock frequency of the laser beam to be irradiated on said photoconductor and a reference light emission intensity of the laser beam are modified when said optical path selecting optical system is moved into the optical paths of the laser beam.

10. A color image forming apparatus as set forth in claim 1, wherein the selected number is one.

11. A color image forming apparatus as set forth in claim 1, wherein the reflector surfaces of the polygon body have different surface inclinations, the number of different surface inclinations corresponding to the number of image forming units.

12. A color image forming apparatus as set forth in claim 11, wherein, when the optical path selecting optical system is moved out of the optical paths of the laser beam reflected from the polygon body, the laser beam reflected from each of the reflector surfaces of the polygon body is directed toward the image forming unit that corresponds to said each reflector surface.

13. A color image forming apparatus as set forth in claim 1, wherein the non-selected image forming units are not active when said optical path selecting optical system is moved into the optical paths of the laser beam.

14. A method of increasing a copy speed of a color image forming apparatus having a single laser beam source, a plurality of image forming units each including at least a photoconductor, a charger, and a developing device containing one of mutually different colors, and a polygon body provided with a plurality of reflector surfaces respectively corresponding to said plurality of image forming units for distributing a laser beam from said single laser beam source to said plurality of image forming units, said method comprising the steps of:

moving a lens in optical paths of the laser beam reflected from the polygon body to deflect the laser beam reflected from the polygon body to one of said image forming units but not to the other image forming units and operating said one image forming unit at a higher speed, when the color image forming apparatus is operating in a monochrome mode.

* * * * *